United States Patent
Driesen et al.

(10) Patent No.: US 9,436,724 B2
(45) Date of Patent: Sep. 6, 2016

(54) MIGRATING DATA IN TABLES IN A DATABASE

(71) Applicants: Volker Driesen, Heidelberg (DE); Andre Haferkorn, Heidelberg (DE); Nicolai Jordt, Angelbachtal (DE); Juergen Specht, Gerabronn (DE); Steffen Meissner, Heidelberg (DE); Lars-Eric Biewald, Mannheim (DE)

(72) Inventors: Volker Driesen, Heidelberg (DE); Andre Haferkorn, Heidelberg (DE); Nicolai Jordt, Angelbachtal (DE); Juergen Specht, Gerabronn (DE); Steffen Meissner, Heidelberg (DE); Lars-Eric Biewald, Mannheim (DE)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 14/059,380

(22) Filed: Oct. 21, 2013

(65) Prior Publication Data

US 2015/0112923 A1 Apr. 23, 2015

(51) Int. Cl.
*G06F 17/30* (2006.01)

(52) U.S. Cl.
CPC .............................. *G06F 17/30377* (2013.01)

(58) Field of Classification Search
CPC ............ G06F 17/245; G06F 17/3002; G06F 17/30769; G06F 17/3005; G06F 17/30368; G06F 17/30079; G06F 17/30082; G06F 17/30156; G06F 17/30805; G06F 17/303; G06F 17/30339; G06F 17/30377
USPC .......................................................... 707/661
See application file for complete search history.

(56) References Cited

U.S. PATENT DOCUMENTS

| | | | |
|---|---|---|---|
| 6,324,654 B1 | 11/2001 | Wahl et al. | |
| 6,377,959 B1 | 4/2002 | Carlson | |
| 7,228,132 B2 | 6/2007 | Gopalakrishnan et al. | |
| 7,565,376 B2 | 7/2009 | Stegmann et al. | |
| 7,624,340 B2 | 11/2009 | Ritter | |
| 7,630,969 B2 | 12/2009 | Ritter | |
| 7,650,609 B2 | 1/2010 | Klevenz et al. | |
| 7,680,783 B2 | 3/2010 | Ritter et al. | |
| 7,689,904 B2 | 3/2010 | Ritter | |
| 7,877,422 B2 | 1/2011 | Kothandaraman | |
| 7,885,847 B2 | 2/2011 | Wodtke et al. | |
| 7,966,566 B2 | 6/2011 | Ritter et al. | |
| 7,979,296 B2 | 7/2011 | Kruse et al. | |
| 8,001,079 B2 | 8/2011 | Lu et al. | |
| 8,046,389 B2 | 10/2011 | Ritter | |
| 8,099,661 B2 | 1/2012 | Ritter | |
| 8,108,433 B2 | 1/2012 | Baeuerle et al. | |

(Continued)

OTHER PUBLICATIONS

U.S. Appl. No. 12/336,897, filed Dec. 17, 2008, Volker Driesen.

(Continued)

*Primary Examiner* — Hosain Alam
*Assistant Examiner* — Saba Ahmed
(74) *Attorney, Agent, or Firm* — Fish & Richardson P.C.

(57) ABSTRACT

Techniques for migrating data in a database include identifying an update to one or more data entries of a source table; determining that a status of a trigger associated with the source table indicates to update a logging table, and in response: updating, in a first transaction, (i) the one or more data entries of the source table, and (ii) one or more data entries of the logging table based on the user input, and copying content of the source table to a target table; and determining that the status indicates to update the target table, and in response: updating, in a second transaction, (i) the one or more data entries of the source table and (ii) one or more data entries of the target table based on the user input, and updating the content of the target table based on the one or more data entries of the logging table.

20 Claims, 4 Drawing Sheets

(56) References Cited

U.S. PATENT DOCUMENTS

| | | |
|---|---|---|
| 8,140,644 B2 | 3/2012 | Hagale et al. |
| 8,200,634 B2 | 6/2012 | Driesen et al. |
| 8,212,683 B2 | 7/2012 | Klein et al. |
| 8,225,303 B2 | 7/2012 | Wagner et al. |
| 8,291,038 B2 | 10/2012 | Driesen |
| 8,356,010 B2 | 1/2013 | Driesen |
| 8,392,573 B2 | 3/2013 | Lehr et al. |
| 8,402,086 B2 | 3/2013 | Driesen et al. |
| 8,412,739 B2 | 4/2013 | Engelko et al. |
| 8,434,060 B2 | 4/2013 | Driesen et al. |
| 8,479,187 B2 | 7/2013 | Driesen et al. |
| 8,589,909 B2 | 11/2013 | Hu et al. |
| 2002/0161784 A1* | 10/2002 | Tarenskeen ............ G06F 17/303 |
| 2003/0130985 A1 | 7/2003 | Driesen et al. |
| 2005/0027585 A1 | 2/2005 | Wodtke et al. |
| 2005/0033626 A1 | 2/2005 | Kruse et al. |
| 2005/0257216 A1 | 11/2005 | Cornell et al. |
| 2006/0080338 A1 | 4/2006 | Seubert et al. |
| 2006/0085336 A1 | 4/2006 | Seubert et al. |
| 2006/0085450 A1 | 4/2006 | Seubert et al. |
| 2006/0282697 A1 | 12/2006 | Sim-Tang |
| 2007/0061513 A1* | 3/2007 | Tsumagari ............ G06F 3/0605 711/114 |
| 2007/0130112 A1* | 6/2007 | Lin ..................... G06F 17/3002 |
| 2007/0209015 A1 | 9/2007 | Ritter |
| 2008/0059746 A1* | 3/2008 | Fisher ............... G06F 17/30079 711/165 |
| 2008/0098046 A1 | 4/2008 | Alpern et al. |
| 2008/0115134 A1 | 5/2008 | Elliott et al. |
| 2008/0120129 A1 | 5/2008 | Seubert et al. |
| 2008/0255865 A1 | 10/2008 | Ritter et al. |
| 2009/0006443 A1 | 1/2009 | Kothandaraman |
| 2009/0112908 A1 | 4/2009 | Wintel et al. |
| 2009/0198715 A1* | 8/2009 | Barbarek ............ G06F 17/2264 |
| 2010/0088281 A1 | 4/2010 | Driesen et al. |
| 2010/0138440 A1* | 6/2010 | Driesen ............ G06F 17/30377 707/765 |
| 2010/0145910 A1* | 6/2010 | Zhao ................. G06F 17/30348 707/620 |
| 2010/0153341 A1 | 6/2010 | Driesen et al. |
| 2010/0332585 A1 | 12/2010 | Driesen |
| 2012/0005670 A1 | 1/2012 | Driesen et al. |
| 2012/0011190 A1 | 1/2012 | Driesen et al. |
| 2012/0011389 A1 | 1/2012 | Driesen et al. |
| 2012/0023125 A1 | 1/2012 | Driesen et al. |
| 2012/0030184 A1 | 2/2012 | Driesen et al. |
| 2012/0036165 A1 | 2/2012 | Driesen et al. |
| 2012/0041933 A1 | 2/2012 | Driesen |
| 2012/0041988 A1 | 2/2012 | Driesen |
| 2012/0047185 A1 | 2/2012 | Driesen et al. |
| 2012/0159421 A1 | 6/2012 | Driesen |
| 2012/0166459 A1 | 6/2012 | Ritter et al. |
| 2012/0239616 A1 | 9/2012 | Cunningham et al. |
| 2012/0260242 A1 | 10/2012 | Nguyen et al. |
| 2012/0303665 A1 | 11/2012 | Engelko et al. |
| 2012/0304165 A1 | 11/2012 | Bechtel et al. |
| 2012/0317168 A1 | 12/2012 | Driesen et al. |
| 2013/0054530 A1* | 2/2013 | Baker ............... G06F 17/30079 707/639 |
| 2013/0055232 A1 | 2/2013 | Rajan et al. |
| 2013/0080339 A1 | 3/2013 | Driesen et al. |
| 2013/0080617 A1 | 3/2013 | Driesen et al. |
| 2013/0097380 A1* | 4/2013 | Colgrove .......... G06F 17/30159 711/118 |
| 2013/0159247 A1 | 6/2013 | Engelko et al. |
| 2013/0173547 A1* | 7/2013 | Cline .................... G06F 17/303 707/638 |
| 2013/0290259 A1 | 10/2013 | Hoprich et al. |

OTHER PUBLICATIONS

U.S. Appl. No. 12/844,662, filed Jul. 27, 2010, Volker Driesen.
U.S. Appl. No. 12/980,170, filed Dec. 28, 2010, Ritter; Gerd M. et al.
U.S. Appl. No. 13/336,782, filed Dec. 23, 2011, Ritter; Gerd M. et al.
U.S. Appl. No. 13/535,418, filed Jun. 28, 2012, Bettin et al.
U.S. Appl. No. 13/730,746, filed Dec. 28, 2012, Driesen, et al.
U.S. Appl. No. 13/730,753, Dec. 28, 2012, Driesen, et al.
U.S. Appl. No. 13/730,756, filed Dec. 28, 2012, Driesen, et al.
Office Action received in U.S. Appl. No. 13/679,561, filed Nov. 16, 2012; 11 pages.

\* cited by examiner

MIGRATING DATA IN TABLES IN A DATABASE

TECHNICAL BACKGROUND

This disclosure relates to data migration between tables and, more particularly, zero downtime maintenance during data migration between tables.

BACKGROUND

Globally positioned software customers do not accept outages of their business application software. Software customers typically demand uninterrupted business application software particularly with respect to Internet and mobile applications, and expect such business application software to be available all day, every day of the year, with little to no downtime.

Software updates and upgrades mainly include persistency migration, and, as a result, current deployment procedures may include business downtime, which can be a huge issue for a customer since business downtime may correlate with a loss in revenue (systems being down cannot contribute to the business processes creating revenue) and reputation (the services the customer offers to the end users—which might be customers and consumers of our customers—are down for a certain period of time).

SUMMARY

The present disclosure relates to computer-implemented methods, software, and systems for data migration between tables. In some implementations, an update to one or more data entries of a source table is identified. In some examples, a status of a trigger associated with the source table is determined to indicate to update a logging table, and in response: updating, in a first transaction, (i) the one or more data entries of the source table, and (ii) one or more data entries of the logging table based on the user input, and copying content of the source table to a target table. In some examples, the status of the trigger associated with the source table is determined to indicate to update the target table, and in response: updating, in a second transaction, (i) the one or more data entries of the source table and (ii) one or more data entries of the target table based on the user input, and updating the content of the target table based on the one or more data entries of the logging table.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, identifying the update further includes receiving a user input that comprises the update.

In a second aspect combinable with any of the previous aspects, copying the content of the source table to the target table further includes segmenting the content of the source table into one or more segments; and copying each segment of the content from the source table to the target table.

In a third aspect combinable with any of the previous aspects, copying each segment of the content from the source table to the target table further includes locking the segment of content currently being copied from the source table to the target table; and restricting modification of the content associated with the segment of content of the source table based on the locking.

In a fourth aspect combinable with any of the previous aspects, locking the respective segment of content currently being copied from the source table to the target table further includes locking one or more table rows of content associated with the segment of the source table content.

In a fifth aspect combinable with any of the previous aspects, copying content of the source table to the target table further includes excluding the one or more data entries of the source table that were updated in the first transaction from being copied to the target table.

In a sixth aspect combinable with any of the previous aspects, the source table is associated with a first structure.

A seventh aspect combinable with any of the previous aspects further includes creating the target table, the target table associated with a second structure differing from the first structure; and associating the second structure with the content of the source table to be copied to the target table.

An eighth aspect combinable with any of the previous aspects further includes identifying a first table name associated with the source table; replacing the first table name associated with the source table with a second table name; and associating the first table name with the target table.

Various implementations of a computing system according to the present disclosure may have one or more of the following features. For example, such features include an always-available system that includes active database tables.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
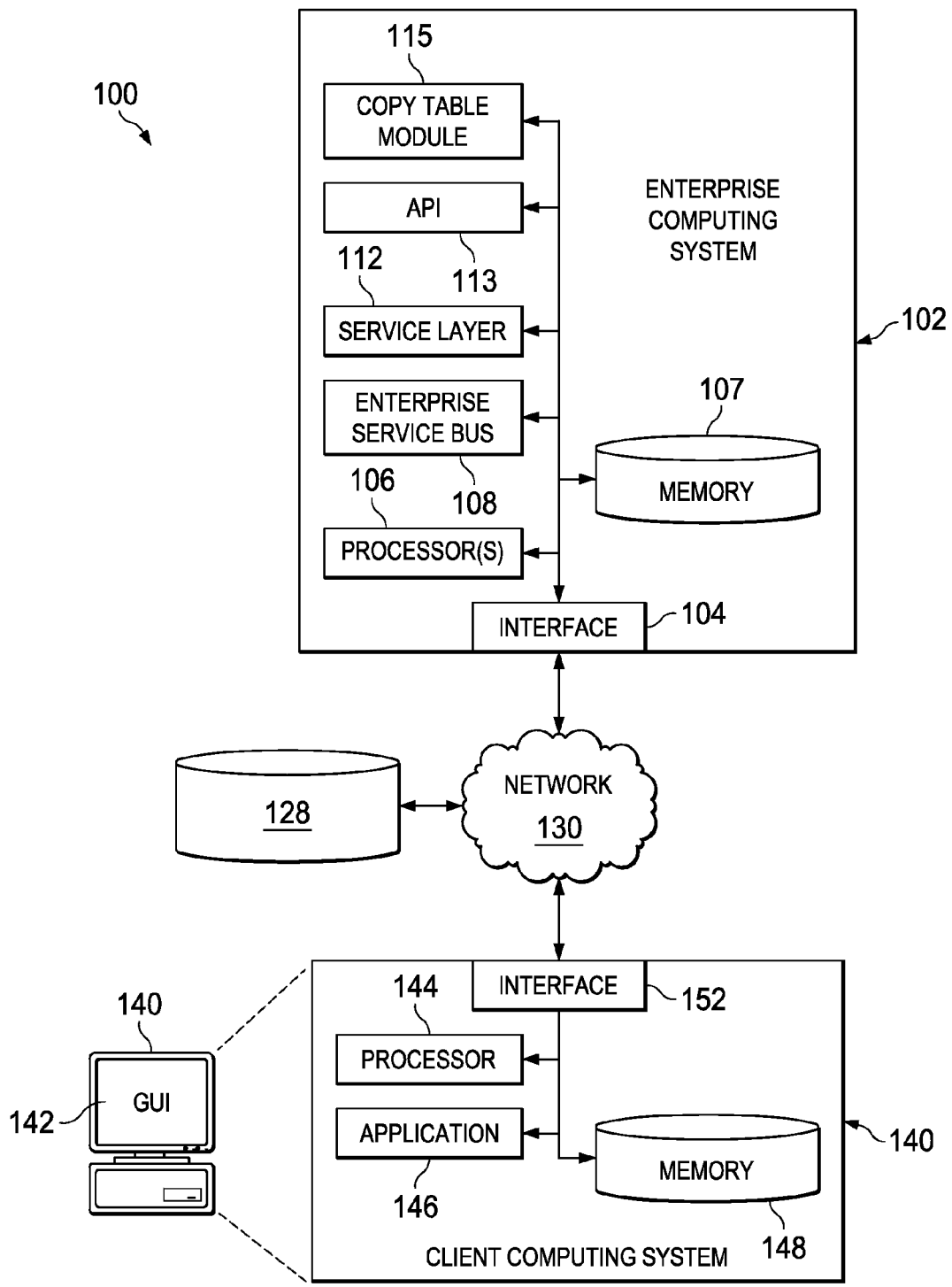
FIG. 1 illustrates an example distributed computing system for data migration between tables.

FIG. 1 illustrates an example distributed computing system 100 for data migration between tables. In some implementations, an update to one or more data entries of a source table is identified. In some examples, a status of a trigger associated with the source table is determined to indicate to update a logging table, and in response: updating, in a first transaction, (i) the one or more data entries of the source table, and (ii) one or more data entries of the logging table based on the user input, and copying content of the source table to a target table. In some examples, the status of the trigger associated with the source table is determined to indicate to update the target table, and in response: updating, in a second transaction, (i) the one or more data entries of the source table and (ii) one or more data entries of the target table based on the user input, and updating the content of the target table based on the one or more data entries of the logging table.

In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed via the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 includes a table copy module 115. At a high level, in some aspects, the table copy module 115 identifies an update to a source table. The table copy module 115 further determines a status of a trigger associated with the source table. In some implementations, the status indicates to update a logging table. In response, the table copy module 115 updates, in a first transaction, the source table and the logging table based on the user input. Further, the table copy module 115 copies content of the source table to a target table. In some implementation, the status indicates to update the target table. In response, the table copy module 115 updates, in a second transaction, the source table and the target table based on the user input. Further, the table copy module 115 updates the content of the target table based on the logging table.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (i.e., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
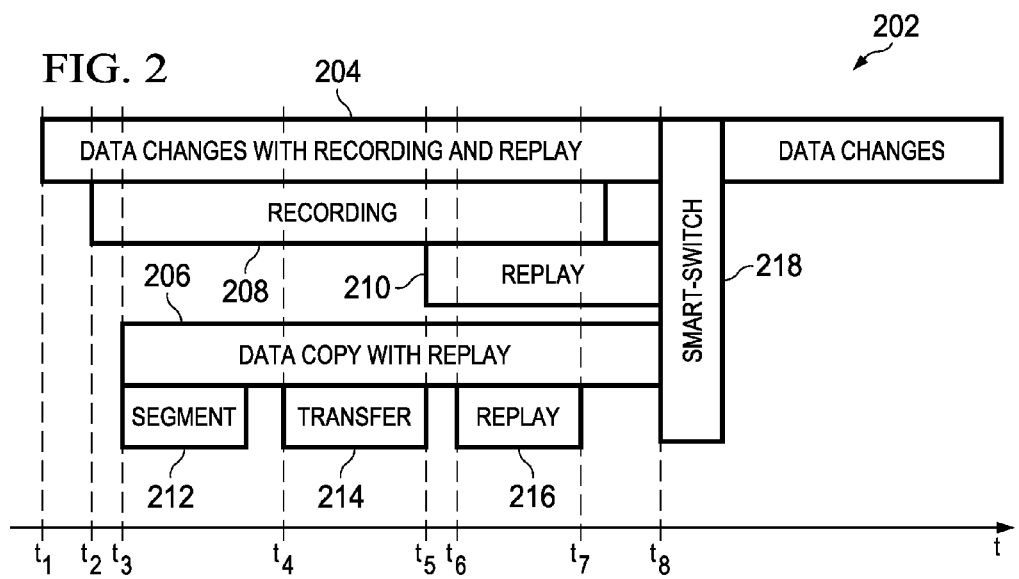
FIG. 2 illustrates a timeline of a procedure for migration of data between tables.

FIG. 2 illustrates a timeline 202 of a procedure for migration of data between tables, e.g., of a database. Specifically, the timeline 202 illustrates creating a copy of a source table that is consistent with the source table and that allows use of the source table in parallel during the copy procedure. In other words, a table copy procedure (e.g., a "live clone" procedure) can be run in parallel with productive use of the source table. Thus, the copy of the source table (e.g., the target table) will have the same content as the source table, even if the content of the source table has been changed (e.g., inserts, updates, deletes) during the table copy procedure. Specifically, the content of the target table is transcationally consistent, that is, the source table and target table are updated in a single transaction.

In general, the table copy procedure includes creating the target table empty and equipping the source table with triggers. In some examples, the triggers enable identifying changes to the source table, and writing the changes to a logging table. Data entries are copied from the source table to the target table in an "initial data transfer" (IDT). In some examples, the trigger is then configured to update the target table in addition to writing the changes to the logging table. In some examples, the trigger is switched to cease updating the logging table. A subsequent IDT procedure copies all entries (e.g., changes) recorded in the logging table to the target table.

Thus, the table copy procedure ensures that content in the target table is consistent with respect to updates to the source table. The IDT can be done during productive use of the source table, including inserting, updating, and deleting of content of the source table. Further, data transfer after the initial transfer of content from the source table to the target table is without latency, thus, enabling zero downtime maintenance. In some examples, zero downtime maintenance includes absolute zero downtime maintenance. In some examples, zero downtime maintenance includes substantially zero downtime maintenance.

The timeline 202 includes two procedures, a data changes with recording and replay procedure ("data changes" procedure) 204, and a data copy with replay procedure ("data copy" procedure) 206. In some examples, the data changes procedure 204 corresponds to the source table and the logging table, and the data copy procedure 206 corresponds to the target table. The data changes procedure 204 includes a recording sub-procedure 208 and a replay procedure 210. The data copy procedure 206 includes a segmentation procedure 212, a transfer procedure 214, and a replay procedure 216.

In some implementations, an update to one or more data entries of a source table is identified. Specifically, the table copy module 115 can identify an update to the source table. In some examples, the table copy module 115 identifies user input that includes the update. For example, a user associated with the client computing device 140 can provide user input including the update. In some examples, the table copy module 115 can receive the user input that includes the update (e.g., via the network 130 from the client computing module 140). In some examples, the table copy module 115 can receive the user input that includes the update in response to a request for such user input, or automatically.

For example, at a time $t_1$, the update to the source table is identified. Specifically, the data changes procedure 204 is initiated, that is, a change to the source table is identified, and the table copy procedure, including the data changes procedure 204, is initiated.

In some examples, the user input can include an insert of one or more data entries to the source table, an update of one or more data entries of the source table, or deletion of one or more data entries of the source table.

In some implementations, a status of a trigger associated with the source table is determined to indicate to update a logging table. Specifically, the table copy module 115 can determine that the status of the trigger associated with the source table indicates to update the logging table. In response to determining that the status of the trigger associated with the source table indicates to update the logging table, in a (single) first transaction, the one or more data entries of the source table are updated, and one or more data entries of the logging table are updated. The updating of the source table and the logging table is based on the user input. For example, the table copy module 115 updates the logging table and the source table in a single transaction based on the user input.

In some examples, at a time $t_2$, the source table and the logging table updated, in a single transaction, based on the user input. Specifically, the recording sub-procedure 208 is initiated to update the source table and the logging table in a single transaction.

Additionally, in response to determining that the status of the trigger associated with the source table indicates to update the logging table, content is copied from the source table to the target table. For example, the table copy module 115 copies the content from the source table to the target table (e.g., initial data transfer (IDT)).

In some examples, at a time $t_3$, the content is copied from the source table to the target table. For example, the data copy procedure 206 is initiated to copy the content from the source table to the target table.

In some implementations, copying of the content from the source table to the target table further includes segmenting the content of the source table into one or more segments. Specifically, in some examples, the copy table module 115 segments the content of the source table into segments. For example, at the time $t_3$, the segmentation procedure 212 is initiated (as a part of the data copy procedure 206) to segment the source table into one or more segments. Furthermore, copying of the content from the source table to the target table further comprises copying each segment of the content from the source table to the target table. Specifically, the copy table module 115 copies each segment of the content from the source table to the target table. For example, at a time $t_4$, the transfer procedure 214 is initiated (as a part of the data copy procedure 206) to transfer (copy) each segment of the content from the source table to the target table.

In some implementations, copying each segment of the content from the source table to the target table further includes locking the segment of the content currently being copied from the source table to the target table. Specifically, in some examples, the copy table module 115 locks the segment of the content currently being copied. Locking of the segment of the content currently being copied can include preventing concurrent write operations by a user (e.g., of the client computing device 140). Locking of the segment of the content currently being copied facilitates consistency between the source table and the target table. For example, write operations that start after the segment is read and commit before the segment is written to the target table may result in potential data inconsistencies between the source table and the target table as there is no guarantee that these segments (e.g., rows) are transferred again at a later time.

Furthermore, in some implementations, copying each segment of the content from the source table to the target table further includes restricting modification of the content associated with the segment of content of the source table based on the locking. Specifically, in some examples, the copy table module 115 restricts modification of the segment of content based on the locking of the same. For example, restricting modification of the segment of content can include preventing accessing to the segment, and/or preventing updating, inserting, or deleting data entries of the segment of content.

In some implementations, locking of the respective segment of content currently being copied from the source table to the target table further includes locking one or more table rows of content associated with the segment of the source table content. Specifically, in some examples, the copy table module 115 locks table rows of content associated with the segment of content currently being copied. For example, one or more rows (or individual cells) of the segment (or the entire segment) is locked.

In some implementations, copying of the content of the source table to the target table further includes excluding the one or more data entries of the source table that were updated in the first transaction from being copied to the target table. Specifically, the copy table module 115 excludes data entries that were updated in the (single) first transaction from being copied to the target table. For example, the data entries (e.g., rows or individual cells) of the source table are excluded from being transferred (copied) during the IDT from the source table to the target table. In some examples, the data entries of the source table excluded from being transferred from the source table to the target table that have been previously transferred from an "online data transfer" (ODT).

In some examples, copying of the content of the source table to the target table further includes excluding data entries with keys. For example, data entries with the same key that are excluded from being copied to the target table.

In some further implementations, the source table is associated with a first structure (e.g., a table data structure). Additionally, the target table is created and is associated with a second structure that is different from the first structure. In some further implementations, copying of the content of the source table to the target table further includes associating the second structure (of the target table) with the content of the source table to be copied to the target table. Specifically, in some examples, the copy table module 115 associates the second structure with the content of the source table to be copied to the target table. For example, the source table and the target table can differ in structure by, among other ways, 1) key fields may be added to the target table; 2) non-key fields may be added to the target table; 3) non-key fields may be removed from the source table; 4) data types of both key fields and non-key fields may be changed from the source table to the target table; and 5) the sequence of fields may be different between the source table and the target table.

In some implementations, that status of the trigger associated with the source table is determined to indicate the target table is to be updated. Specifically, the table copy module 115 can determine that the status of the trigger associated with the source table indicates to update the target table. In response to determining that the status of the trigger associated with the source table indicates to update the target table, in a (single) second transaction, the one or more data entries of the source table are updated, and one or more entries of the target table are updated. The updating of the source table and the target table is based on the user input. For example, the table copy module 115 updates the target table and the source table in a single transaction based on the user input.

In some examples, at a time $t_5$, the source table and the target table are updated, in a single transaction, based on the user input. Specifically, the replay sub-procedure 210 is initiated to update the source table and the target table in a single transaction.

Additionally, in response to determining that the status of the trigger associated with the source table indicates to update the target table, the content of the target table is updated based on the one or more data entries of the logging table. For example, the table copy module 115 content of the target table is updated based on the entries of the logging table (e.g., online data transfer (ODT)).

In some examples, at a time $t_6$, the content of the target table is updated based on the entries of the logging table. For example, the replay procedure 216 is initiated to update the content of the target table based on the entries of the logging table. For example, during the IDT, a key is read from the logging table. The IDT submits a "select for update" to the source table for the key with "no wait." If the IDT obtains the lock, the key is copied to the target table. If the IDT does not obtain the lock, the IDT continues and tries again later. The IDT iterates these steps until the logging table is empty.

In some implementations, determining that the status of the trigger associated with the source table indicates to update the target table further includes determining that the status of the trigger indicates to cease updating the logging table. Specifically, the table copy module 115 can determine that the status of the trigger associated with the source table further indicates to cease updating the logging table.

In some examples, after the replay procedure 216 is concluded (e.g., the logging table is empty), the target table includes all of the content of the source table and further changes to the source table (e.g., by a user of the client computing device 130) are written in the same transaction to the target table. Thus, there is no latency and data transfer is transcationally consistent. For example, at time $t_7$, the target table and the source table are in-sync with each other.

In some further implementations, a first table name associated with the source table is identified. Specifically, in some examples, the copy table module 115 identifies the name of the source table. The source table name can be included by metadata associated with the source table, and can be a name displayed to the user via a GUI (e.g., the client computing device 140). Furthermore, the first table name associated with the source table is replaced with a second table name. For example, the copy table module 115 replaces the name of the source table with a new, differing table name. In some examples, the second table name differs from the first table name. Additionally, the first table name is associated with the target table. Specifically, in some examples, the copy table module 115 associates the first table name (that was previously associated with the source table) with the target table.

In some examples, at a time $t_8$, a smart-switch procedure 218 is initiated to switch the names of the source table and the target table, as mentioned above. Specifically, the target table is associated with the name of the source table, and the source able is associated with a new name. As a result, productive use by the user (e.g., of the client computing system 140) is switched from the source table to the target table.

Figure 3:
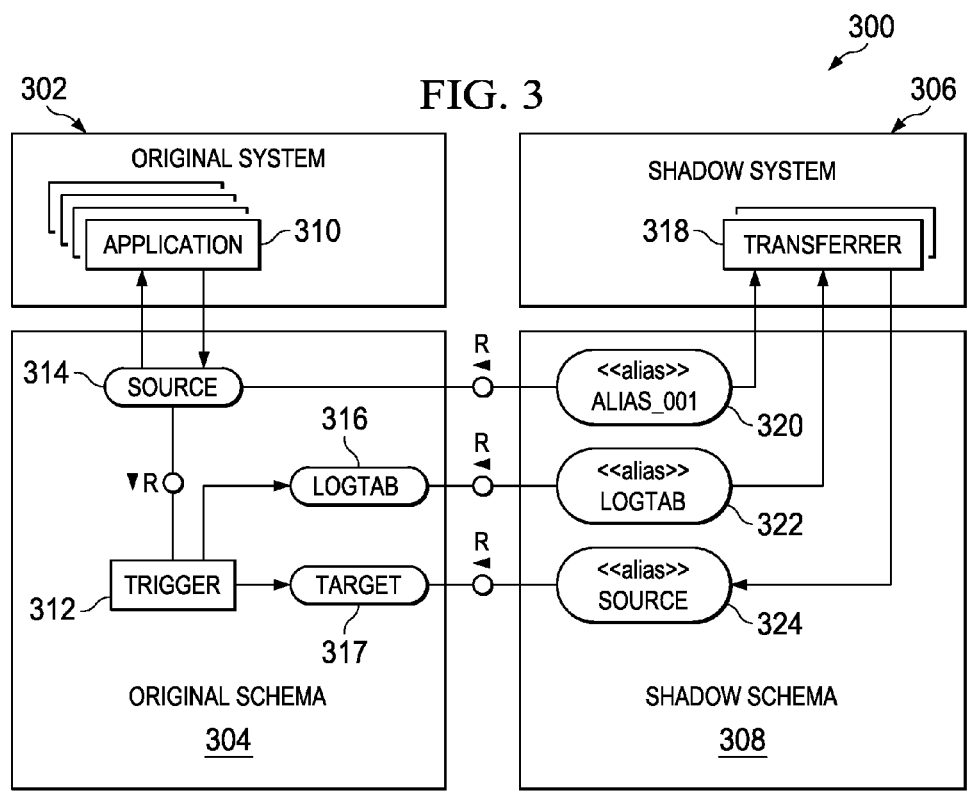
FIG. 3 illustrates an example system for migration of data between tables.

FIG. 3 illustrates an example system 300 for migration of data between tables. System 300 includes an original system 302, an original schema 304, a shadow system 306, and a shadow schema 308. The original system 302 includes one or more applications 310 and the original schema includes a trigger module 312, a source table 314, a logging table 316, and a target table 317. The shadow system 306 includes a transferrer module 318 and the shadow schema includes an alias temporary table 320, an alias logging table 322, and an alias source table 324.

In some implementations, an application 310 (from the one or more applications 310) accesses the source table 314 to write content to the source table 314 and/or receive content from the source table 314. For example, the application 310 can insert, update, or delete one or more data entries of the source table 314. The trigger module 312 identifies that an update has been received to one or more data entries of the source table 314. Based on the trigger associated with the source table 314, the trigger module 312 updates the logging table 316 or the target table 317. For example, the trigger module 312 updates the source table 314 and the logging table 316 in the same transaction when the trigger indicates to update the logging table 314, and updates the source table 314 and the target table 317 in the same transaction when the trigger indicates to update the target table 317.

The shadow schema 308 facilitates the smart-switch of the table names between the source table and the target table. Specifically, the alias temporary table 320 includes a copy of the content from the source table 314, but is associated with a differing table name than what is associated with the source table 314. For example, the alias temporary table 320 is associated with the table name "alias." The alias logging table 322 is further associated with the logging table 316 and includes a copy of the content from the logging table 316. The alias source table 324 is associated with the target table 317 and includes a table name associated with the source table 317. Thus, a "smart-switch" of the table names occurs.

Furthermore, the transferrer module 318 appropriately copies content from the alias temporary table 320 (e.g., the content of the source table 314) and the content from the alias logging table 322 (e.g., the content of the logging table 316) to the alias source table 324, as described above.

Figure 4:
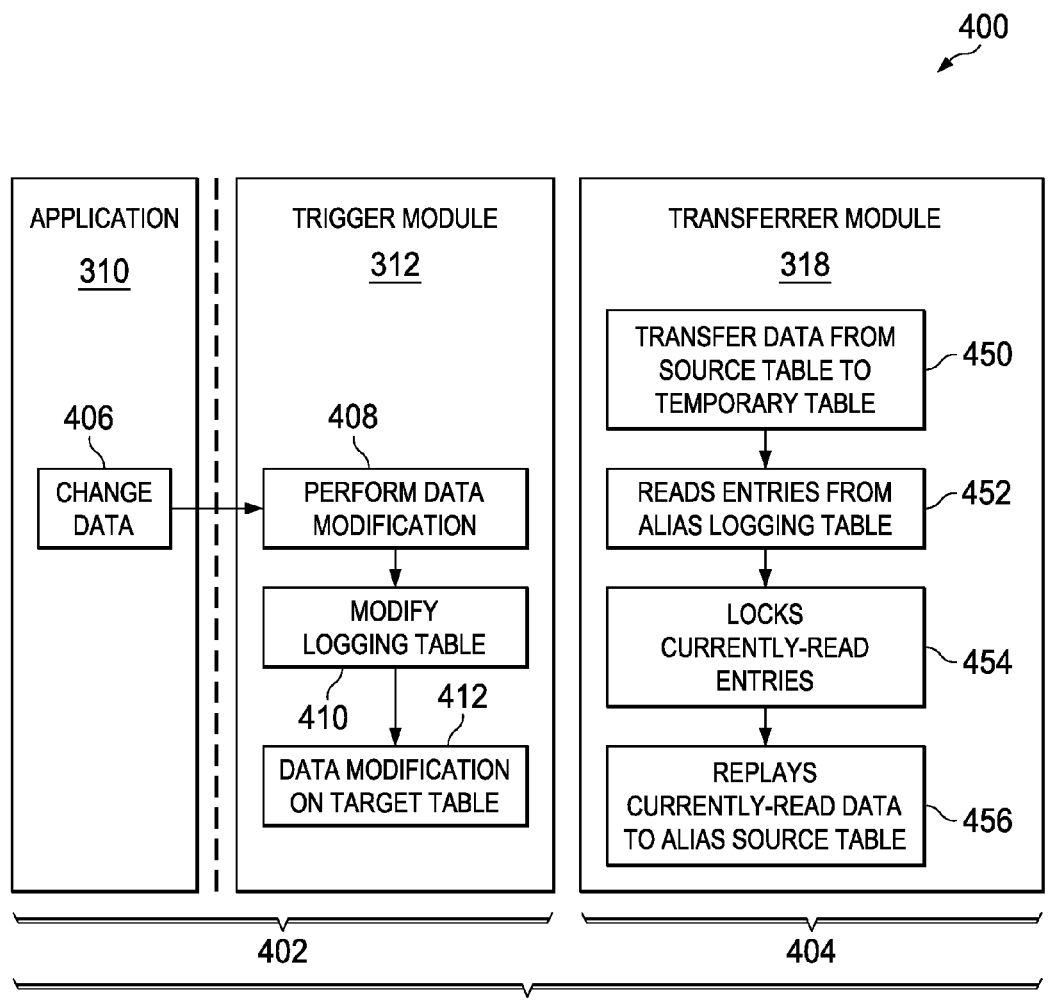
FIG. 4 illustrates a method illustrating actions of an application, a trigger module, and a transferrer module of the computing system.

FIG. 4 illustrates a method 400 (e.g., a swim lane diagram) illustrating actions of the application 310, the trigger module 312, and the transferrer module 318. For clarity of presentation, the description that follows generally describes method 400 in the context of FIGS. 1 and 3. For example, as illustrated, particular steps of the method 400 may be performed on or at an enterprise system, cloud-based system, and/or on-demand system, while other particular steps may be performed on or at a client system or on-premise system. However, method 400 may be performed, for example, by any other suitable system, environment, software, and hardware, or a combination of systems, environments, software, and hardware as appropriate.

Specifically, method 400 illustrates portions of the data changes procedure 204 as a method 402 and portions of the data copy procedure 206 as a method 404. Furthermore, method 400 illustrates that methods 402 and 404 occur in parallel, and further, that the data changes procedure 204 and the data copy procedure 206 occur in parallel.

In step 406, the application 310 changes one or more data entries of the source table 314. In step 408, the trigger module 312 enables performing a data modification language (DML) on the source table 314 (e.g., an update, delete, or insertion of one or more data entries). In step 410, based on the status of the trigger, the trigger module 312 further enables modification of the logging table 316 (e.g., in the same transaction). In step 412, based on the status of the trigger, the trigger module further enables DML on the target table 317 (e.g., in the same transaction).

In step 450, the transferrer module 318 transfers data from the source table 314 to the alias temporary table 320; transfers data from the logging table 316 to the alias logging table 322; and transfers data from the alias temporary table 320 to the alias source table 324. In step 452, the transferrer module 318 reads entries from the alias logging table 322, and in step 454, the transferrer module 318 locks the currently-read entries on the alias logging table 322. In step 456, the transferrer module 318 replays the currently read data to the alias source table 324.

Figure 5:
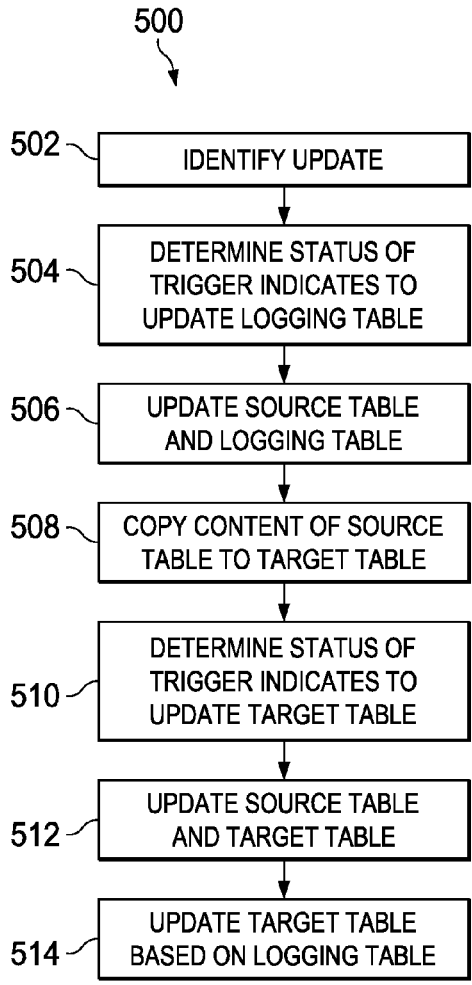
FIGS. 5-6 illustrates flow charts that illustrates a method for migration of data between tables.

FIG. 5 illustrates a flow chart that illustrates a method for migration of data between tables. For clarity of presentation, the description that follows generally describes method 500 in the context of FIGS. 1 and 2. For example, as illustrated, particular steps of the method 500 may be performed on or at an enterprise system, cloud-based system, and/or on-demand system, while other particular steps may be performed on or at a client system or on-premise system. However, method 500 may be performed, for example, by any other suitable system, environment, software, and hardware, or a combination of systems, environments, software, and hardware as appropriate.

At step 502, an update to one or more data entries of a source table is identified. In some examples, the update includes receiving user input. In some examples, the update includes an insert, update, or delete to the one or more data entries of the source table. At step 504, a status of a trigger associated with the source table is determined to indicate to update a logging table. At step 506, in a first transaction, (i) the one or more data entries of the source table are updated, and (ii) one or more data entries of the logging table are updated, based on the user input. At step 508, content of the source table is copied to a target table. In some examples, the one or more data entries of the source table that were updated in the first transaction are excluded from being copied to the target table. At step 510, the status of the trigger associated with the source table is determined to indicate to update the target table. At step 512, in a second transaction, (i) the one or more data entries of the source table are updated and (ii) one or more data entries of the target table are updated, based on the user input. At step 514, the content of the target table is updated based on the one or more data entries of the logging table.

Figure 6:
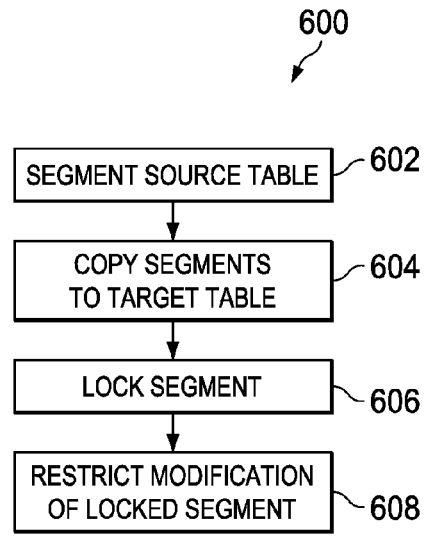

FIG. 6 illustrates a flow chart that illustrates a method for migration of data between tables. For clarity of presentation, the description that follows generally describes method 600 in the context of FIGS. 1 and 2. For example, as illustrated, particular steps of the method 600 may be performed on or at an enterprise system, cloud-based system, and/or on-demand system, while other particular steps may be performed on or at a client system or on-premise system. However, method 600 may be performed, for example, by any other suitable system, environment, software, and hardware, or a combination of systems, environments, software, and hardware as appropriate.

At step 602, the content of the source table is segmented into one or more segments. At step 604, each segment of the content is copied from the source table to the target table. At step 606, the segment of content currently being copied from the source table to the target table is locked. In some examples, one or more table rows of content associated with the segment of the source table content are locked. At step 608, modification of the content associated with the segment of content of the source table is restricted based on the locking.

Figure 7:
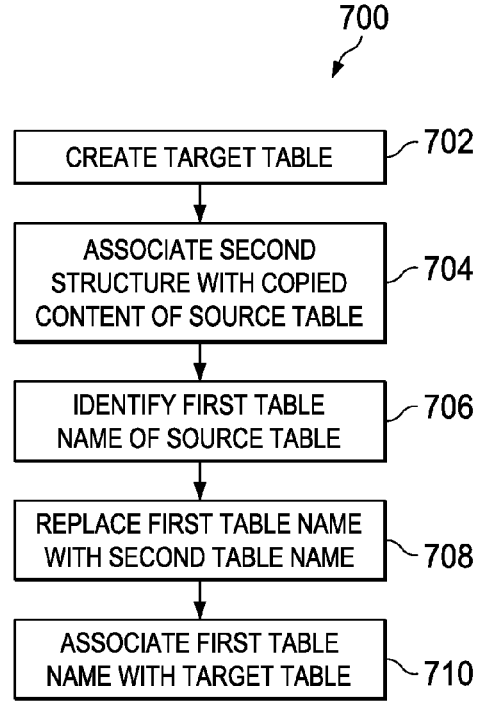
FIG. 7 illustrates a flow chart that illustrates a method for smart-switching between tables.

FIG. 7 illustrates a flow chart that illustrates a method for smart-switching between tables. For clarity of presentation, the description that follows generally describes method 700 in the context of FIGS. 1 and 2. For example, as illustrated, particular steps of the method 700 may be performed on or at an enterprise system, cloud-based system, and/or on-demand system, while other particular steps may be performed on or at a client system or on-premise system. However, method 700 may be performed, for example, by any other suitable system, environment, software, and hardware, or a combination of systems, environments, software, and hardware as appropriate.

At step 702, the target table is created. In some examples, the target table is associated with a second structure differing from the first structure. At step 704, the second structure is associated with the content of the source table to be copied to the target table. At step 706, a first table name associated with the source table is identified. At step 708, the first table name associated with the source table is replaced with a second table name. At step 710, the first table name is associated with the target table.

In some further implementations, for ODT, the updates of insertion, updating and deleting data entries (e.g., of the source table) are distinguished. For example, for insert and update operations, for every field in the source table, the corresponding field (identified by name) in the target table is filled with the new value, either as an insert (row is new or has not yet been transferred by IDT) or an update. Prerequisite for such is that the data types in the source table and target table are compatible, i.e., the value from the source field can be entered into the target field without conversion. In some examples, for fields that exist only in the source table or the target table are omitted. Specifically, the omitted fields in the target table are filled with either the default value for the particular data type/field or null. Fields that exist only in the source table are ignored. Additionally, the key field values of the affected row are written to the logging table, either as insert or update. Furthermore, for example, for delete operations, the rows identified by the key values are deleted from the target table and the logging table. In some examples, exceptions resulting from the row not existing in either of these tables can be ignored as this indicates that the row has not yet been transferred by ODT or IDT.

In some further implementations, for IDT, a database view (access view) is used to exclude ODT-transferred rows as a transfer source and the target table as transfer destination. The access view combines information from the source table and the logging table to restrict the full source data set to those rows not yet transferred by ODT. Modifications except delete operations of the source table are transparent as they are immediately reflected in the logging table and excluded from the data set read via the access view. Delete operations result in the deleted row disappearing from the result set. The data read via the access view is segmented, and the data transfer is executed. The segment to be transferred is locked against concurrent write access to prevent a production transaction to alter and commit parts of the segment data between the read and commit point-in-time of the IDT transaction.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4-7), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method for migrating data in a database, comprising:
    identifying a first update to one or more data entries of a source table;
    in response to identifying the first update, determining that a status of a trigger associated with the source table indicates to update a logging table, and in response:
        updating, in a first transaction and based on the first update, (i) the one or more data entries of the source table, and (ii) one or more data entries of the logging table, and
        copying content of the source table to a target table;
    identifying a second update to one or more data entries of the source table;
    in response to identifying the second update, determining that the status of the trigger associated with the source table indicates to update the target table, and in response:
        updating, in a second transaction and based on the second update, (i) the one or more data entries of the source table and (ii) one or more data entries of the target table,
        updating the content of the target table based on the one or more data entries of the logging table, and
        determining that the source table and the target table are in-sync based on the updates to the target table;
    identifying a third update to one or more data entries of the source table; and
    in response to identifying the third update and based on determining that the source table and the target table are in-sync, updating, in a third transaction and based on the third update, one or more data entries of the target table,
    wherein the first transaction and the second transaction occur in parallel, and copying the content of the source table to the target table includes excluding one or more data entries from the source table to the target table that are being transferred during the second transaction.

2. The computer-implemented method of claim 1, wherein identifying the first update further comprises receiving a user input that comprises the first update, the first update comprising an insertion, deletion, or update to the one or more data entries of the source table.

3. The computer-implemented method of claim 1, wherein copying the content of the source table to the target table further comprises:
    segmenting the content of the source table into one or more segments; and
    copying each segment of the content from the source table to the target table.

4. The computer-implemented method of claim 3, wherein copying each segment of the content from the source table to the target table further comprises:
    locking the segment of content currently being copied from the source table to the target table; and
    restricting modification of the content associated with the segment of content of the source table based on the locking.

5. The computer-implemented method of claim 4, wherein locking the respective segment of content currently being copied from the source table to the target table further comprises locking one or more table rows of content associated with the segment of the source table content.

6. The computer-implemented method of claim 1, wherein copying content of the source table to the target table further comprises:
    excluding the one or more data entries of the source table that were updated in the first transaction from being copied to the target table.

7. The computer-implemented method of claim 1, wherein the source table is associated with a first structure, the method further comprising:
    creating the target table, the target table associated with a second structure differing from the first structure; and associating the second structure with the content of the source table to be copied to the target table.

8. The computer-implemented method of claim 1, further comprising:
identifying a first table name associated with the source table;
replacing the first table name associated with the source table with a second table name; and
associating the first table name with the target table.

9. A computer program product encoded on a non-transitory storage medium, the product comprising non-transitory, computer readable instructions for causing one or more processors to perform operations comprising:
identifying a first update to one or more data entries of a source table;
in response to identifying the first update, determining that a status of a trigger associated with the source table indicates to update a logging table, and in response:
updating, in a first transaction and based on the first update, (i) the one or more data entries of the source table, and (ii) one or more data entries of the logging table, and
copying content of the source table to a target table;
identifying a second update to one or more data entries of the source table;
in response to identifying the second update, determining that the status of the trigger associated with the source table indicates to update the target table, and in response:
updating, in a second transaction and based on the second update, (i) the one or more data entries of the source table and (ii) one or more data entries of the target table,
updating the content of the target table based on the one or more data entries of the logging table, and
determining that the source table and the target table are in-sync based on the updates to the target table;
identifying a third update to one or more data entries of the source table; and
in response to identifying the third update and based on determining that the source table and the target table are in-sync, updating, in a third transaction and based on the third update, one or more data entries of the target table,
wherein the first transaction and the second transaction occur in parallel, and copying the content of the source table to the target table includes excluding one or more data entries from the source table to the target table that are being transferred during the second transaction.

10. The computer storage medium of claim 9, wherein copying the content of the source table to the target table further comprises:
segmenting the content of the source table into one or more segments; and
copying each segment of the content from the source table to the target table.

11. The computer storage medium of claim 10, wherein copying each segment of the content from the source table to the target table further comprises:
locking the segment of content currently being copied from the source table to the target table; and
restricting modification of the content associated with the segment of content of the source table based on the locking.

12. The computer storage medium of claim 11, wherein locking the respective segment of content currently being copied from the source table to the target table further comprises locking one or more table rows of content associated with the segment of the source table content.

13. The computer storage medium of claim 9, wherein copying content of the source table to the target table further comprises:
excluding the one or more data entries of the source table that were updated in the first transaction from being copied to the target table.

14. The computer storage medium of claim 9, wherein the source table is associated with a first structure, the method further comprising:
creating the target table, the target table associated with a second structure differing from the first structure; and
associating the second structure with the content of the source table to be copied to the target table.

15. The computer storage medium of claim 9, the operations further comprising:
identifying a first table name associated with the source table;
replacing the first table name associated with the source table with a second table name; and
associating the first table name with the target table.

16. A system of one or more computers configured to perform operations comprising:
identifying a first update to one or more data entries of a source table;
in response to identifying the first update, determining that a status of a trigger associated with the source table indicates to update a logging table, and in response:
updating, in a first transaction and based on the first update, (i) the one or more data entries of the source table, and (ii) one or more data entries of the logging table, and
copying content of the source table to a target table;
identifying a second update to one or more data entries of the source table;
in response to identifying the second update, determining that the status of the trigger associated with the source table indicates to update the target table, and in response:
updating, in a second transaction and based on the second update, (i) the one or more data entries of the source table and (ii) one or more data entries of the target table,
updating the content of the target table based on the one or more data entries of the logging table, and
determining that the source table and the target table are in-sync based on the updates to the target table;
identifying a third update to one or more data entries of the source table; and
in response to identifying the third update and based on determining that the source table and the target table are in-sync, updating, in a third transaction and based on the third update, one or more data entries of the target table,
wherein the first transaction and the second transaction occur in parallel, and copying the content of the source table to the target table includes excluding one or more data entries from the source table to the target table that are being transferred during the second transaction.

17. The system of claim 16, wherein copying the content of the source table to the target table further comprises:
segmenting the content of the source table into one or more segments; and
copying each segment of the content from the source table to the target table.

18. The system of claim 17, wherein copying each segment of the content from the source table to the target table further comprises:
   locking the segment of content currently being copied from the source table to the target table; and
   restricting modification of the content associated with the segment of content of the source table based on the locking.

19. The system of claim 18, wherein locking the respective segment of content currently being copied from the source table to the target table further comprises locking one or more table rows of content associated with the segment of the source table content.

20. The system of claim 16, the operations further comprising:
   identifying a first table name associated with the source table;
   replacing the first table name associated with the source table with a second table name; and
   associating the first table name with the target table.

* * * * *